United States Patent
Bo et al.

(10) Patent No.: US 10,579,355 B2
(45) Date of Patent: Mar. 3, 2020

(54) DOCKER CONTAINER OPERATING METHOD AND APPARATUS

(71) Applicant: Huawei Technologies Co., Ltd., Shenzhen (CN)

(72) Inventors: Hai Bo, Xi'an (CN); Ji Liu, Xi'an (CN); Hao Luo, Xi'an (CN); Chaobo Xian, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 178 days.

(21) Appl. No.: 15/913,186

(22) Filed: Mar. 6, 2018

(65) Prior Publication Data

US 2018/0196654 A1    Jul. 12, 2018

Related U.S. Application Data

(63) Continuation of application No. PCT/CN2016/107978, filed on Nov. 30, 2016.

(30) Foreign Application Priority Data

Dec. 3, 2015 (CN) .......................... 2015 1 0883372

(51) Int. Cl.
*G06F 9/455* (2018.01)
*G06F 8/60* (2018.01)

(52) U.S. Cl.
CPC ............ *G06F 8/60* (2013.01); *G06F 9/455* (2013.01); *G06F 9/45533* (2013.01)

(58) Field of Classification Search
CPC ...................................... G06F 9/455
See application file for complete search history.

(56) References Cited

U.S. PATENT DOCUMENTS 8,862,741 B1 * 10/2014 Tegtmeier ............. H04L 41/145
709/220
2012/0173866 A1    7/2012 Ashok et al.
(Continued)

FOREIGN PATENT DOCUMENTS

CN    104951308 A    9/2015
CN    105045656 A    11/2015
(Continued)

OTHER PUBLICATIONS

Machine Translation and Abstract of Chinese Publication No. CN107766130, Mar. 6, 2018, 10 pages.
(Continued)

*Primary Examiner* — Charlie Sun
(74) *Attorney, Agent, or Firm* — Conley Rose, P.C.

(57) ABSTRACT

A DOCKER container operating method and apparatus to operate, in a DOCKER container using a simple and efficient method, an application previously established in a virtual machine. A virtual machine image corresponding to a to-be-executed application is obtained according to an identifier of the to-be-executed application included in a received execution command. Metadata information of the virtual machine image and layer data corresponding to the DOCKER container may be read from all layer data in the virtual machine image, and the layer data corresponding to the DOCKER container is layer data required for operating the DOCKER container corresponding to the to-be-executed application. The DOCKER container corresponding to the to-be-executed application operates according to the read metadata information of the virtual machine image and the read layer data corresponding to the DOCKER container.

20 Claims, 6 Drawing Sheets

(56) References Cited

U.S. PATENT DOCUMENTS

2013/0212161 A1* 8/2013 Ben-Shaul ............ G06F 9/4451
709/203
2014/0279909 A1 9/2014 Sudarsanam et al.
2018/0196654 A1 7/2018 Bo et al.

FOREIGN PATENT DOCUMENTS

CN 105511943 A 4/2016
CN 107766130 A 3/2018

OTHER PUBLICATIONS

Naik, N., "Migrating from Virtualization to Dockerization in the Cloud: Simulation and Evaluation of Distributed Systems," XP033022002, IEEE 10th International Symposium on the Maintenance and Evolution of Service-Oriented and Cloud-Based Environments, Oct. 3, 2016, 8 pages.
Foreign Communication From a Counterpart Application, European Application No. 16869982.5, Extended European Search Report dated Aug. 28, 2018, 10 pages.
Machine Translation and Abstract of Chinese Publication No. CN104951308, Sep. 30, 2015, 13 pages.
Machine Translation and Abstract of Chinese Publication No. CN105045656, Nov. 11, 2015, 15 pages.
Machine Translation and Abstract of Chinese Publication No. CN105511943, Apr. 20, 2016, 51 pages.
Foreign Communication From a Counterpart Application, PCT Application No. PCT/CN2016/107978, English Translation of International Search Report dated Feb. 13, 2017, 2 pages.

* cited by examiner

CONT.
FROM
FIG. 2B

Pack the preprocessing image and the metadata information of the container image to obtain a container image corresponding to the identifier of the to-be-executed application ~219

Operate the container image corresponding to the identifier of the to-be-executed application to operate the DOCKER container corresponding to the to-be-executed application ~221

FIG. 2C

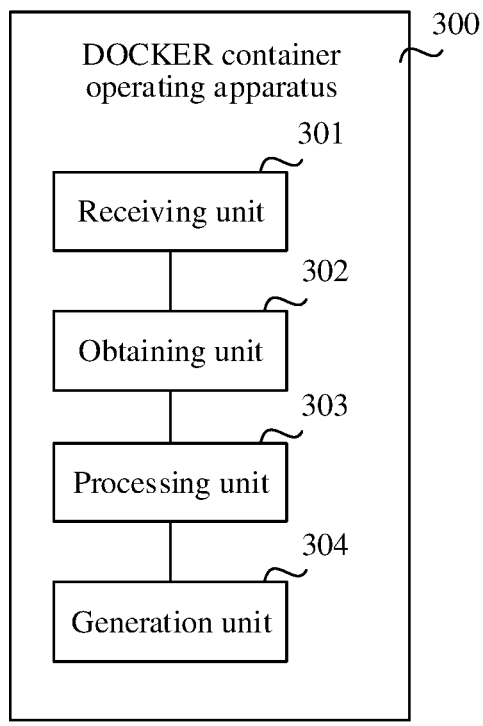

FIG. 3

DOCKER CONTAINER OPERATING METHOD AND APPARATUS

CROSS-REFERENCE TO RELATED APPLICATIONS

This application is a continuation of International Patent Application No. PCT/CN2016/107978 filed on Nov. 30, 2016, which claims priority to Chinese Patent Application No. 201510883372.8 filed on Dec. 3, 2015. The disclosures of the aforementioned applications are hereby incorporated by reference in their entireties.

TECHNICAL FIELD

Embodiments of the present disclosure relate to the communications field, and in particular, to a DOCKER container operating method and apparatus.

BACKGROUND

DOCKER is an open-source application container engine for providing an automatic deployment solution of an application. A container is quickly created in a LINUX system. The container is a lightweight virtual machine, and deploys and operates an application. In addition, it may be very convenient and easy to implement automatic installation, deployment, and upgrade of the application by means of file configuration. The DOCKER virtualizes multiple containers. The containers are separated from each other, and no interface exists. Therefore, production environment and development environment of a container may be separated from those of another container, and therefore, do not affect those of the other container.

Currently, a footstone of a cloud service is operating system level separation. One or more virtual machines operate services on a same host machine. However, the DOCKER implements application level separation, changes a basic development unit and an operating unit, and converts direct operation of the virtual machine into operation of a "container" operated by the application. As a DOCKER container technology is gradually used in a development environment, a testing environment, and a production environment, how to operate, in the DOCKER, an application previously established in the virtual machine is an important problem currently researched.

A solution in other approaches is as follows. A developer researches deployment of an application on the virtual machine, including information about the application such as a deployment architecture, a deployment component, an installation configuration manner, or a commissioning manner. Then, the developer establishes, according to a DOCKER container image requirement, a container image corresponding to the application, performs deployment, configuration, and testing on the established container image, stores the container image of the application in a DOCKER container image registry after the testing succeeds, and invokes and operates the container image of the application from the container image registry when the application needs to be operated.

It can be learned that in the foregoing method, when a virtual machine image of the application previously established in the virtual machine operates, the virtual machine image of the application first needs to be manually converted into a container image. In this method, the developer needs to research the deployment of the application on the virtual machine, further needs to learn of the DOCKER container image requirement, and establishes the container image of the application. A requirement for the developer is relatively high in this process. In addition, the deployment of the application on the virtual machine is relatively time-consuming and complex. This wastes much energy and time of the developer.

Based on the above, it is urgent to provide a DOCKER container operating method and apparatus in order to operate, in the DOCKER container using a simple and efficient method, the application previously established in the virtual machine.

SUMMARY

Embodiments of the present disclosure provide a DOCKER container operating method and apparatus, to operate, in a DOCKER container using a simple and efficient method, an application previously established in a virtual machine.

An embodiment of the present disclosure provides a DOCKER container operating method, including receiving an execution command used to instruct to operate a DOCKER container corresponding to a to-be-executed application, where the execution command includes an identifier of the to-be-executed application, obtaining, according to the identifier of the to-be-executed application that is included in the execution command, a virtual machine image corresponding to the identifier of the to-be-executed application, reading, from all layer data in the virtual machine image, metadata information of the virtual machine image and layer data corresponding to the DOCKER container, where the layer data corresponding to the DOCKER container is layer data required for operating the DOCKER container corresponding to the to-be-executed application, generating, according to the read layer data corresponding to the DOCKER container, a snapshot layer file corresponding to the DOCKER container, where the snapshot layer file corresponding to the DOCKER container includes a snapshot of the layer data corresponding to the DOCKER container, and the snapshot layer file corresponding to the DOCKER container is a readable and writable layer file, mounting the snapshot layer file corresponding to the DOCKER container to a working directory, performing environment configuration according to the read metadata information of the virtual machine image, and operating the snapshot layer file that is mounted to the working directory and that corresponds to the DOCKER container, to operate the DOCKER container corresponding to the to-be-executed application.

In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in this embodiment of the present disclosure, the application previously established in the virtual machine can operate in the DOCKER container using a simple and effective method, and a requirement for the developer is reduced.

Optionally, reading, from all layer data in the virtual machine image, metadata information of the virtual machine image and layer data corresponding to the DOCKER container includes invoking a virtual machine image driver, and reading, from all the layer data in the virtual machine image using the invoked virtual machine image driver, the metadata information of the virtual machine image and the layer data corresponding to the DOCKER container.

Further, information such as a format of the virtual machine image that needs to be read may be configured in the virtual machine image driver. In this way, the virtual machine image may be successfully read using the virtual machine image driver in order to directly read the metadata information of the virtual machine image and the layer data corresponding to the DOCKER container in the virtual machine image. The following is avoided. In the other approaches, a virtual machine image of a to-be-executed application is manually converted into a container image, and the developer does not need to learn of both the overall deployment of the virtual machine image corresponding to the to-be-executed application, and the container image establishment method. It can be learned that according to the method provided in this embodiment of the present disclosure, the application previously established in the virtual machine can operate in the DOCKER container using a simple and effective method, and the requirement for the developer is reduced.

Optionally, the layer data corresponding to the DOCKER container includes layer data in all the layer data in the virtual machine image except a kernel file, a file in a system directory, and a file in a root (boot) directory.

When the DOCKER container of the to-be-executed application program operates, files such as the kernel file, the file in the system directory, and the file in the root (boot) directory may be not operated. Therefore, in this embodiment of the present disclosure, the files such as the kernel file, the file in the system directory, and the file in the root (boot) directory in the virtual machine image may be not read when the DOCKER container of the to-be-executed application program operates. In this way, network load can be reduced, and a data processing speed can be improved.

Optionally, performing environment configuration according to the read metadata information of the virtual machine image further includes configuring a system parameter according to the read metadata information of the virtual machine image corresponding to the to-be-executed application such that the configured system parameter matches the metadata information of the virtual machine image corresponding to the to-be-executed application, where the system parameter is an environmental variable.

Further, before the to-be-executed application operates, the system parameter is configured such that the configured system parameter matches the metadata information of the virtual machine image corresponding to the to-be-executed application. In this way, a success rate of operating the to-be-executed application can be improved.

Optionally, before obtaining, according to the identifier of the to-be-executed application that is included in the execution command, a virtual machine image corresponding to the identifier of the to-be-executed application, the method further includes generating, based on a virtual machine technology, the virtual machine image corresponding to the to-be-executed application, and storing the virtual machine image in a virtual machine image storage area.

Obtaining, according to the identifier of the to-be-executed application that is included in the execution command, a virtual machine image corresponding to the identifier of the to-be-executed application includes obtaining, from the virtual machine image storage area according to the identifier of the to-be-executed application that is included in the execution command, the virtual machine image corresponding to the identifier of the to-be-executed application.

In this way, the virtual machine image corresponding to the identifier of the to-be-executed application may be quickly determined according to the identifier of the to-be-executed application in order to improve the data processing speed.

An embodiment of the present disclosure provides a DOCKER container operating method, including receiving an execution command used to instruct to operate a DOCKER container corresponding to a to-be-executed application, where the execution command includes an identifier of the to-be-executed application, obtaining, according to the identifier of the to-be-executed application that is included in the execution command, a virtual machine image corresponding to the identifier of the to-be-executed application, reading all layer data and metadata information of the virtual machine image from the virtual machine image, generating, according to all the read layer data, a snapshot layer file corresponding to all the layer data, where the snapshot layer file corresponding to all the layer data is a readable and writable layer file, mounting the snapshot layer file corresponding to all the layer data to a first working directory, deleting, from the snapshot layer file that is mounted to the first working directory and that corresponds to all the layer data, layer data except layer data corresponding to the DOCKER container, where the layer data corresponding to the DOCKER container is layer data required for operating the DOCKER container corresponding to the to-be-executed application, packing the metadata information of the virtual machine image and a remaining layer file that is in the snapshot layer file corresponding to all the layer data and that is obtained after the deletion operation, to obtain a preprocessing image, generating metadata information of a container image according to the preprocessing image, where the metadata information of the container image includes format information of the preprocessing image, packing the preprocessing image and the metadata information of the container image to obtain the container image corresponding to the identifier of the to-be-executed application, and operating the container image corresponding to the identifier of the to-be-executed application to operate the DOCKER container corresponding to the to-be-executed application.

In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in this embodiment of the present disclosure, the application previously established in the virtual machine can operate in the DOCKER container using a simple and effective method, and a requirement for the developer is reduced.

Optionally, reading all layer data and metadata information of the virtual machine image from the virtual machine image further includes invoking a virtual machine image driver, and reading all the layer data and the metadata information of the virtual machine image from the virtual machine image using the invoked virtual machine image driver.

Further, information such as a format of the virtual machine image that needs to be read may be configured in the virtual machine image driver. In this way, the virtual machine image may be successfully read using the virtual machine image driver.

Optionally, the layer data corresponding to the DOCKER container includes layer data in all the layer data in the virtual machine image except a kernel file, a file in a system directory, and a file in a root (boot) directory.

The metadata information of the container image includes a storage format and a storage location of information in the preprocessing image, and a hierarchical relationship of the layer data corresponding to the DOCKER container.

When the DOCKER container of the to-be-executed application program operates, files such as the kernel file, the file in the system directory, and the file in the root (boot) directory may be not operated. Therefore, in this embodiment of the present disclosure, the files such as the kernel file, the file in the system directory, and the file in the root (boot) directory are deleted from the snapshot layer file corresponding to all the layer data. In this way, a newly generated container image does not include the files such as the kernel file, the file in the system directory, and the file in the root (boot) directory. When the container image is operated, the files such as the kernel file, the file in the system directory, and the file in the root (boot) directory may be not read. Therefore, network load can be reduced, and a data processing speed can be improved.

Optionally, after packing the preprocessing image and the metadata information of the container image to obtain the container image corresponding to the identifier of the to-be-executed application, the method further includes storing, in a container image storage area, the container image corresponding to the identifier of the to-be-executed application, deleting the snapshot layer file corresponding to all the layer data, and offloading the virtual machine image corresponding to the identifier of the to-be-executed application. In this way, resource occupation and system load can be reduced.

Optionally, operating the container image corresponding to the identifier of the to-be-executed application includes reading, from the container image, the metadata information of the container image and the layer data corresponding to the DOCKER container, where the layer data corresponding to the DOCKER container is the layer data required for operating the DOCKER container corresponding to the to-be-executed application, generating, according to the read layer data corresponding to the DOCKER container, a snapshot layer file corresponding to the DOCKER container, where the snapshot layer file corresponding to the DOCKER container includes a snapshot of the layer data corresponding to the DOCKER container, and the snapshot layer file corresponding to the DOCKER container is a readable and writable layer file, mounting the snapshot layer file corresponding to the DOCKER container to a second working directory, and performing environment configuration according to the read metadata information of the container image, and operating the snapshot layer file mounted to the second working directory, to operate the DOCKER container corresponding to the to-be-executed application.

In this way, the DOCKER container corresponding to the to-be-executed application may operate by reading the container image. In addition, the following is avoided. In the other approaches, a virtual machine image of a to-be-executed application is manually converted into a container image, and the developer does not need to learn of both the overall deployment of the virtual machine image corresponding to the to-be-executed application, and the container image establishment method. It can be learned that according to the method provided in this embodiment of the present disclosure, the application previously established in the virtual machine can operate in the DOCKER container using a simple and effective method, and the requirement for the developer is reduced.

Optionally, reading, from the container image, the metadata information of the container image and the layer data corresponding to the DOCKER container includes invoking a container image driver, and reading, from the container image using the invoked container image driver, the metadata information of the container image and the layer data corresponding to the DOCKER container.

Further, information such as a format of the container image that needs to be read may be configured in the container image driver. In this way, the container image may be successfully read using the container image driver.

Optionally, performing environment configuration according to the read metadata information of the container image includes configuring a system parameter according to the read metadata information in the container image corresponding to the to-be-executed application such that the configured system parameter matches the metadata information in the container image corresponding to the to-be-executed application, where the system parameter is an environmental variable.

Further, before the to-be-executed application operates, the system parameter is configured such that the configured system parameter matches the metadata information of the virtual machine image corresponding to the to-be-executed application. In this way, a success rate of operating the to-be-executed application can be improved.

Optionally, before obtaining, according to the identifier of the to-be-executed application that is included in the execution command, a virtual machine image corresponding to the identifier of the to-be-executed application, the method further includes generating, based on a virtual machine technology, the virtual machine image corresponding to the identifier of the to-be-executed application, and storing, in a virtual machine image storage area, the virtual machine image corresponding to the identifier of the to-be-executed application.

Obtaining, according to the identifier of the to-be-executed application that is included in the execution command, a virtual machine image corresponding to the identifier of the to-be-executed application includes obtaining, from the virtual machine image storage area according to the identifier of the to-be-executed application that is included in the execution command, the virtual machine image corresponding to the identifier of the to-be-executed application.

In this way, the virtual machine image corresponding to the identifier of the to-be-executed application may be quickly determined according to the identifier of the to-be-executed application in order to improve the data processing speed.

An embodiment of the present disclosure provides a DOCKER container operating apparatus, including a receiving unit configured to receive an execution command used to instruct to operate a DOCKER container corresponding to a to-be-executed application, where the execution command includes an identifier of the to-be-executed application, an obtaining unit configured to obtain, according to the identifier of the to-be-executed application that is included in the execution command, a virtual machine image corresponding to the identifier of the to-be-executed application, and a processing unit configured to read, from all layer data in the virtual machine image, metadata information of the virtual machine image and layer data corresponding to the DOCKER container, generate, according to the read layer data corresponding to the DOCKER container, a snapshot layer file corresponding to the DOCKER container, mount the snapshot layer file corresponding to the DOCKER container to a working directory, and perform environment configuration according to the read metadata information of the virtual machine image, and operate the snapshot layer file that is mounted to the working directory and that corresponds to the DOCKER container to operate the DOCKER container corresponding to the to-be-executed application, where the layer data corresponding to the DOCKER container is layer data required for operating the DOCKER container corresponding to the to-be-executed application, the snapshot layer file corresponding to the DOCKER container includes a snapshot of the layer data corresponding to the DOCKER container, and the snapshot layer file corresponding to the DOCKER container is a readable and writable layer file.

Optionally, the processing unit is further configured to invoke a virtual machine image driver, and read, from all the layer data in the virtual machine image using the invoked virtual machine image driver, the metadata information of the virtual machine image and the layer data corresponding to the DOCKER container.

Optionally, the layer data corresponding to the DOCKER container includes layer data in all the layer data in the virtual machine image except a kernel file, a file in a system directory, and a file in a root (boot) directory.

Optionally, the processing unit is further configured to configure a system parameter according to the read metadata information of the virtual machine image corresponding to the to-be-executed application such that the configured system parameter matches the metadata information of the virtual machine image corresponding to the to-be-executed application, where the system parameter is an environmental variable.

Optionally, the apparatus further includes a generation unit configured to generate, based on a virtual machine technology, the virtual machine image corresponding to the to-be-executed application, and store the virtual machine image in a virtual machine image storage area.

The obtaining unit is further configured to obtain, from the virtual machine image storage area according to the identifier of the to-be-executed application that is included in the execution command, the virtual machine image corresponding to the identifier of the to-be-executed application.

An embodiment of the present disclosure provides a DOCKER container operating apparatus, including a receiving unit configured to receive an execution command used to instruct to operate a DOCKER container corresponding to a to-be-executed application, where the execution command includes an identifier of the to-be-executed application, an obtaining unit configured to obtain, according to the identifier of the to-be-executed application that is included in the execution command, a virtual machine image corresponding to the identifier of the to-be-executed application, a conversion unit configured to read all layer data and metadata information of the virtual machine image from the virtual machine image, generate, according to all the read layer data, a snapshot layer file corresponding to all the layer data, where the snapshot layer file corresponding to all the layer data is a readable and writable layer file, mount the snapshot layer file corresponding to all the layer data to a first working directory, delete, from the snapshot layer file that is mounted to the first working directory and that corresponds to all the layer data, layer data except layer data corresponding to the DOCKER container, pack the metadata information of the virtual machine image and a remaining layer file that is in the snapshot layer file corresponding to all the layer data and that is obtained after the deletion operation, to obtain a preprocessing image, generate metadata information of a container image according to the preprocessing image, where the metadata information of the container image includes format information of the preprocessing image, and pack the preprocessing image and the metadata information of the container image to obtain the container image corresponding to the identifier of the to-be-executed application, where the layer data corresponding to the DOCKER container is layer data required for operating the DOCKER container corresponding to the to-be-executed application, and a processing unit configured to operate the container image corresponding to the identifier of the to-be-executed application to operate the DOCKER container corresponding to the to-be-executed application.

Optionally, the conversion unit is further configured to invoke a virtual machine image driver, and read all the layer data and the metadata information of the virtual machine image from the virtual machine image using the invoked virtual machine image driver.

Optionally, the layer data corresponding to the DOCKER container includes layer data in all the layer data in the virtual machine image except a kernel file, a file in a system directory, and a file in a root (boot) directory.

The metadata information of the container image includes a storage format and a storage location of information in the preprocessing image, and a hierarchical relationship of the layer data corresponding to the DOCKER container.

Optionally, the conversion unit is further configured to store, in a container image storage area, the container image corresponding to the identifier of the to-be-executed application, delete the snapshot layer file corresponding to all the layer data, and offload the virtual machine image corresponding to the identifier of the to-be-executed application.

Optionally, the processing unit is further configured to read, from the container image, the metadata information of the container image and the layer data corresponding to the DOCKER container, where the layer data corresponding to the DOCKER container is the layer data required for operating the DOCKER container corresponding to the to-be-executed application, generate, according to the read layer data corresponding to the DOCKER container, a snapshot layer file corresponding to the DOCKER container, where the snapshot layer file corresponding to the DOCKER container includes a snapshot of the layer data corresponding to the DOCKER container, and the snapshot layer file corresponding to the DOCKER container is a readable and writable layer file, mount the snapshot layer file corresponding to the DOCKER container to a second working directory, and perform environment configuration according to the read metadata information of the container image, and operate the snapshot layer file mounted to the second working directory to operate the DOCKER container corresponding to the to-be-executed application.

Optionally, the processing unit is further configured to invoke a container image driver, and read, from the container image using the invoked container image driver, the metadata information of the container image and the layer data corresponding to the DOCKER container.

Optionally, the processing unit is further configured to configure a system parameter according to the read metadata information in the container image corresponding to the to-be-executed application such that the configured system parameter matches the metadata information in the container image corresponding to the to-be-executed application, where the system parameter is an environmental variable.

Optionally, the apparatus further includes a generation unit configured to generate, based on a virtual machine technology, the virtual machine image corresponding to the identifier of the to-be-executed application, and store, in a virtual machine image storage area, the virtual machine image corresponding to the identifier of the to-be-executed application.

The obtaining unit is further configured to obtain, from the virtual machine image storage area according to the identifier of the to-be-executed application that is included in the execution command, the virtual machine image corresponding to the identifier of the to-be-executed application.

An embodiment of the present disclosure provides a DOCKER container operating apparatus, including a transceiver configured to receive an execution command used to instruct to operate a DOCKER container corresponding to a to-be-executed application, where the execution command includes an identifier of the to-be-executed application, a memory configured to store a virtual machine image corresponding to the identifier of the to-be-executed application, and a processor configured to obtain, according to the identifier of the to-be-executed application that is included in the execution command, the virtual machine image corresponding to the identifier of the to-be-executed application, read, from all layer data in the virtual machine image, metadata information of the virtual machine image and layer data corresponding to the DOCKER container, generate, according to the read layer data corresponding to the DOCKER container, a snapshot layer file corresponding to the DOCKER container, mount the snapshot layer file corresponding to the DOCKER container to a working directory, and perform environment configuration according to the read metadata information of the virtual machine image, and operate the snapshot layer file that is mounted to the working directory and that corresponds to the DOCKER container, to operate the DOCKER container corresponding to the to-be-executed application, where the layer data corresponding to the DOCKER container is layer data required for operating the DOCKER container corresponding to the to-be-executed application, the snapshot layer file corresponding to the DOCKER container includes a snapshot of the layer data corresponding to the DOCKER container, and the snapshot layer file corresponding to the DOCKER container is a readable and writable layer file.

Optionally, the processor is further configured to invoke a virtual machine image driver, and read, from all the layer data in the virtual machine image using the invoked virtual machine image driver, the metadata information of the virtual machine image and the layer data corresponding to the DOCKER container.

Optionally, the layer data corresponding to the DOCKER container includes layer data in all the layer data in the virtual machine image except a kernel file, a file in a system directory, and a file in a root (boot) directory.

Optionally, the processor is further configured to configure a system parameter according to the read metadata information of the virtual machine image corresponding to the to-be-executed application such that the configured system parameter matches the metadata information of the virtual machine image corresponding to the to-be-executed application, where the system parameter is an environmental variable.

Optionally, the processor is further configured to generate, based on a virtual machine technology, the virtual machine image corresponding to the to-be-executed application, and store the virtual machine image in a virtual machine image storage area, and obtain, from the virtual machine image storage area according to the identifier of the to-be-executed application that is included in the execution command, the virtual machine image corresponding to the identifier of the to-be-executed application.

An embodiment of the present disclosure provides a DOCKER container operating apparatus, including a transceiver configured to receive an execution command used to instruct to operate a DOCKER container corresponding to a to-be-executed application, where the execution command includes an identifier of the to-be-executed application, a memory configured to store a virtual machine image corresponding to the identifier of the to-be-executed application, and a processor configured to obtain, according to the identifier of the to-be-executed application that is included in the execution command, the virtual machine image corresponding to the identifier of the to-be-executed application, read all layer data and metadata information of the virtual machine image from the virtual machine image, generate, according to all the read layer data, a snapshot layer file corresponding to all the layer data, where the snapshot layer file corresponding to all the layer data is a readable and writable layer file, mount the snapshot layer file corresponding to all the layer data to a first working directory, delete, from the snapshot layer file that is mounted to the first working directory and that corresponds to all the layer data, layer data except layer data corresponding to the DOCKER container, pack the metadata information of the virtual machine image and a remaining layer file that is in the snapshot layer file corresponding to all the layer data and that is obtained after the deletion operation, to obtain a preprocessing image, generate metadata information of a container image according to the preprocessing image, where the metadata information of the container image includes format information of the preprocessing image, pack the preprocessing image and the metadata information of the container image to obtain the container image corresponding to the identifier of the to-be-executed application, where the layer data corresponding to the DOCKER container is layer data required for operating the DOCKER container corresponding to the to-be-executed application, and operate the container image corresponding to the identifier of the to-be-executed application to operate the DOCKER container corresponding to the to-be-executed application.

Optionally, the processor is further configured to invoke a virtual machine image driver, and read all the layer data and the metadata information of the virtual machine image from the virtual machine image using the invoked virtual machine image driver.

Optionally, the layer data corresponding to the DOCKER container includes layer data in all the layer data in the virtual machine image except a kernel file, a file in a system directory, and a file in a root (boot) directory.

The metadata information of the container image includes a storage format and a storage location of information in the preprocessing image, and a hierarchical relationship of the layer data corresponding to the DOCKER container.

Optionally, the processor is further configured to store, in a container image storage area, the container image corresponding to the identifier of the to-be-executed application, delete the snapshot layer file corresponding to all the layer data, and offload the virtual machine image corresponding to the identifier of the to-be-executed application.

Optionally, the processor is further configured to read, from the container image, the metadata information of the container image and the layer data corresponding to the DOCKER container, where the layer data corresponding to the DOCKER container is the layer data required for operating the DOCKER container corresponding to the to-be-executed application, generate, according to the read layer data corresponding to the DOCKER container, a snapshot layer file corresponding to the DOCKER container, where the snapshot layer file corresponding to the DOCKER container includes a snapshot of the layer data corresponding to the DOCKER container, and the snapshot layer file corresponding to the DOCKER container is a readable and writable layer file, mount the snapshot layer file corresponding to the DOCKER container to a second working directory, and perform environment configuration according to the read metadata information of the container image, and operate the snapshot layer file mounted to the second working directory, to operate the DOCKER container corresponding to the to-be-executed application.

Optionally, the processor is further configured to invoke a container image driver, and read, from the container image using the invoked container image driver, the metadata information of the container image and the layer data corresponding to the DOCKER container.

Optionally, the processor is further configured to configure a system parameter according to the read metadata information in the container image corresponding to the to-be-executed application such that the configured system parameter matches the metadata information in the container image corresponding to the to-be-executed application, where the system parameter is an environmental variable.

Optionally, the processor is further configured to generate, based on a virtual machine technology, the virtual machine image corresponding to the identifier of the to-be-executed application, store, in a virtual machine image storage area, the virtual machine image corresponding to the identifier of the to-be-executed application, and obtain, from the virtual machine image storage area according to the identifier of the to-be-executed application that is included in the execution command, the virtual machine image corresponding to the identifier of the to-be-executed application.

In the embodiments of the present disclosure, the execution command used to instruct to operate the DOCKER container corresponding to the to-be-executed application is received, and the execution command includes the identifier of the to-be-executed application. The virtual machine image corresponding to the identifier of the to-be-executed application is obtained according to the identifier of the to-be-executed application that is included in the execution command. The metadata information of the virtual machine image and the layer data corresponding to the DOCKER container are read from all the layer data in the virtual machine image, and the layer data corresponding to the DOCKER container is the layer data required for operating the DOCKER container corresponding to the to-be-executed application. The snapshot layer file corresponding to the DOCKER container is generated according to the read layer data corresponding to the DOCKER container. The snapshot layer file corresponding to the DOCKER container includes the snapshot of the layer data corresponding to the DOCKER container, and the snapshot layer file corresponding to the DOCKER container is the readable and writable layer file. The snapshot layer file corresponding to the DOCKER container is mounted to the working directory, and the environment configuration is performed according to the read metadata information of the virtual machine image. The snapshot layer file that is mounted to the working directory and that corresponds to the DOCKER container is operated to operate the DOCKER container corresponding to the to-be-executed application. In the embodiments of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in the embodiments of the present disclosure, the application previously established in the virtual machine can operate in the DOCKER container using a simple and effective method, and a requirement for the developer is reduced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 2B and FIG. 2C are a schematic flowchart of a DOCKER container operating method according to an embodiment of the present disclosure;

FIG. 3 is a schematic structural diagram of a DOCKER container operating apparatus according to an embodiment of the present disclosure;

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
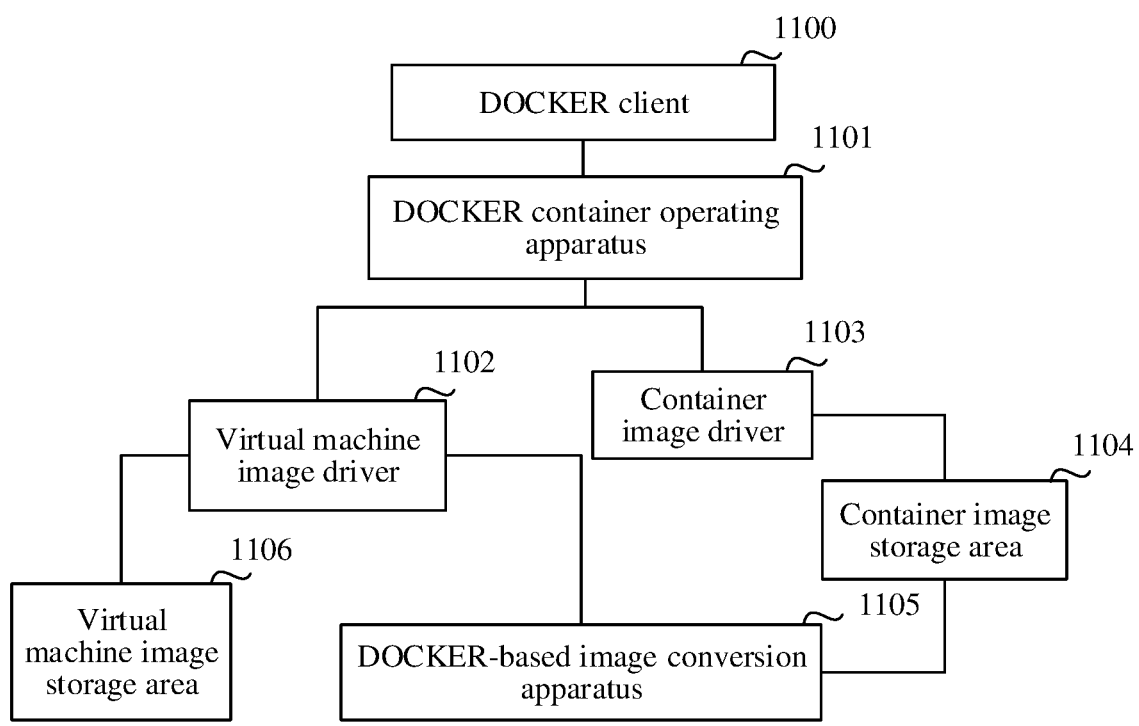
FIG. 1 is a schematic diagram of a system architecture applicable to operating a DOCKER container according to an embodiment of the present disclosure.

FIG. 1 shows an example of a schematic diagram of a system architecture applicable to a DOCKER container operating method according to an embodiment of the present disclosure. As shown in FIG. 1, the system architecture includes a DOCKER client 1100 and a DOCKER container operating apparatus 1101. Optionally, the system architecture further includes a virtual machine image driver 1102, a container image driver 1103, a virtual machine image storage area 1106 for storing a virtual machine image, and a container image storage area 1104 for storing a container image. The DOCKER client 1100 is configured to send, to the DOCKER container operating apparatus 1101, an operating command used to instruct to operate a DOCKER container of a to-be-operated application, and receive an operating result of the virtual machine image or an operating result of the container image that is returned by the DOCKER container operating apparatus 1101.

The DOCKER container operating apparatus 1101 is configured to receive the operating command that is sent by the DOCKER client 1100 and used to instruct to operate the DOCKER container, and drive, according to the operating command, the virtual machine image driver 1102 to operate the virtual machine image. The DOCKER container operating apparatus 1101 receives the operating result of the virtual machine image returned by the virtual machine image driver 1102. Alternatively, the DOCKER container operating apparatus 1101 converts the virtual machine image into the container image, then operates the container image by driving the container image driver 1103, and receives the operating result of the container image that is returned by the container image driver 1103. The container image driver 1103 is configured to operate the container image, and the virtual machine image driver 1102 is configured to operate the virtual machine image. The virtual machine image driver 1102 supports virtual machine image recognition, virtual machine image layering, and metadata maintenance in the virtual machine image.

Optionally, the system architecture applicable to this embodiment of the present disclosure further includes a DOCKER-based image conversion apparatus 1105. The DOCKER-based image conversion apparatus 1105 is configured to convert the virtual machine image into the container image, and store the container image in the container image storage area 1104. The container image driver 1103 obtains the container image from the container image storage area 1104. After obtaining a virtual machine image corresponding to the to-be-executed application from the virtual machine image storage area 1106, the virtual machine image driver 1102 reads the virtual machine image, converts the read virtual machine image into a container image using the DOCKER-based image conversion apparatus 1105, and stores the container image in the container image storage area 1104.

In this embodiment of the present disclosure, the to-be-executed application is a conventional application program. Before step 201, the to-be-executed application successfully establishes the virtual machine image in a virtual machine based on a virtual machine technology. As a DOCKER container technology develops, a to-be-executed application previously established in the virtual machine currently needs to operate in a DOCKER container. This embodiment of the present disclosure specially provides the following embodiments for this type of to-be-executed application.

Figure 2A:
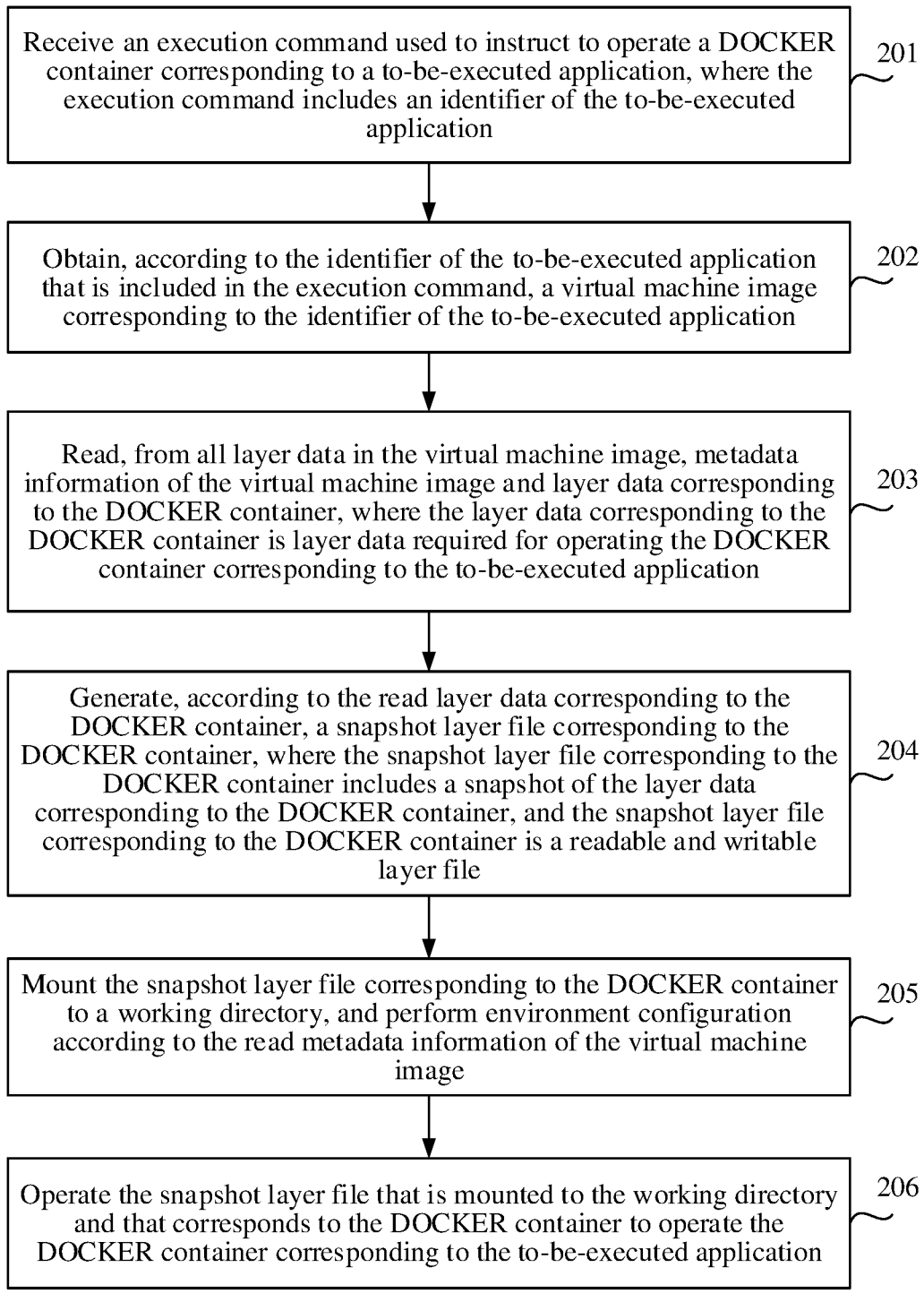
FIG. 2A is a schematic flowchart of a DOCKER container operating method according to an embodiment of the present disclosure.

FIG. 2A shows an example of a schematic flowchart of a DOCKER container operating method according to an embodiment of the present disclosure.

Based on the foregoing content, an embodiment of the present disclosure provides a DOCKER container operating method. As shown in FIG. 2A, the method includes the following steps.

Step 201: Receive an execution command used to instruct to operate a DOCKER container corresponding to a to-be-executed application, where the execution command includes an identifier of the to-be-executed application.

Step 202: Obtain, according to the identifier of the to-be-executed application that is included in the execution command, a virtual machine image corresponding to the identifier of the to-be-executed application. Optionally, the virtual machine image corresponding to the identifier of the to-be-executed application may be obtained from a virtual machine image storage area, and then a read operation is performed on the virtual machine image in step 203.

Step 203: Read, from all layer data in the virtual machine image, metadata information of the virtual machine image and layer data corresponding to the DOCKER container, where the layer data corresponding to the DOCKER container is layer data required for operating the DOCKER container corresponding to the to-be-executed application.

Step 204: Generate, according to the read layer data corresponding to the DOCKER container, a snapshot layer file corresponding to the DOCKER container, where the snapshot layer file corresponding to the DOCKER container includes a snapshot of the layer data corresponding to the DOCKER container, and the snapshot layer file corresponding to the DOCKER container is a readable and writable layer file.

Step 205: Mount the snapshot layer file corresponding to the DOCKER container to a working directory, and perform environment configuration according to the read metadata information of the virtual machine image.

Step 206: Operate the snapshot layer file that is mounted to the working directory and that corresponds to the DOCKER container to operate the DOCKER container corresponding to the to-be-executed application.

According to the method provided from step 201 to step 206 in this embodiment of the present disclosure, the virtual machine image corresponding to the DOCKER container is directly operated. According to the two solutions, an application previously established in a virtual machine can operate in the DOCKER using a simple and effective method. The following is avoided. In the other approaches, a container image corresponding to an application that previously operates in the virtual machine is manually established, and a requirement for a developer is reduced.

Before step 201, optionally, the virtual machine image corresponding to the to-be-executed application is generated based on a virtual machine technology, and the virtual machine image is stored in the virtual machine image storage area. In this way, step 202 includes obtaining, from the virtual machine image storage area according to the identifier of the to-be-executed application that is included in the execution command, the virtual machine image corresponding to the identifier of the to-be-executed application. The virtual machine image storage area may be in local, or may be in a cloud. Obtaining a virtual machine image corresponding to the identifier of the to-be-executed application includes locally obtaining the virtual machine image or downloading the virtual machine image from the cloud to local. Then, the read operation is performed on the virtual machine image in step 203.

Optionally, step 203 includes invoking a virtual machine image driver, and reading, from all the layer data in the virtual machine image using the invoked virtual machine image driver, the metadata information of the virtual machine image and the layer data corresponding to the DOCKER container. In this embodiment of the present disclosure, the virtual machine image driver may successfully read the virtual machine image according to a format of the virtual machine image.

All the layer data included in the virtual machine image is virtual machine data information actually stored in the virtual machine image, such as an operating system, a library file, a runnable program, or configuration. All the layer data included in the virtual machine image is divided into two parts, the layer data corresponding to the DOCKER container and other layer data. The layer data corresponding to the DOCKER container is the layer data required for operating the DOCKER container corresponding to the to-be-executed application, that is, layer data that needs to be read when the to-be-executed application is operated. Optionally, the layer data corresponding to the DOCKER container includes layer data in all the layer data in the virtual machine image except a kernel file, a file in a system directory, and a file in a root (boot) directory. The other layer data is layer data that may not need to be read when the to-be-executed application is operated, such as the kernel file, the file in the system directory, or the file in the root (boot) directory.

The metadata information of the virtual machine image is format information of the virtual machine image. For example, information such as a storage format, a storage location, and a hierarchical relationship of information in a virtual machine image file is recorded. Preferably, the read metadata information of the virtual machine image and the read layer data corresponding to the DOCKER container are stored in local.

In step 204, the snapshot corresponding to the layer data corresponding to the DOCKER container is generated based on a snapshot mechanism in the virtual machine and according to the layer data corresponding to the DOCKER container. The obtained snapshot is the snapshot layer file corresponding to the DOCKER container. The snapshot layer file corresponding to the DOCKER container is also a working layer file, and may be used to store a file generated in a DOCKER container operating process.

In step 205, the snapshot layer file corresponding to the DOCKER container is mounted to the working directory in order to perform read and write operations on the snapshot layer. Further, a block device of the virtual machine image is generated according to layer data corresponding to the DOCKER container in the virtual machine image, and the block device of the virtual machine image is mounted to the working directory of the DOCKER container. The block device is further a type of device in a LINUX system.

Optionally, step 205 includes configuring a system parameter according to the read metadata information of the virtual machine image corresponding to the to-be-executed application such that the configured system parameter matches the metadata information of the virtual machine image corresponding to the to-be-executed application. The system parameter is an environmental variable or related parameter information of the to-be-operated application.

Optionally, in step 206, the snapshot layer file that is mounted to the working directory and that corresponds to the DOCKER container is operated to operate the DOCKER container corresponding to the to-be-executed application. A result obtained after the snapshot layer file that is mounted to the working directory and that corresponds to the DOCKER container is operated is an operating result of the virtual machine image.

It can be learned from the foregoing content that in this embodiment of the present disclosure, the execution command used to instruct to operate the DOCKER container corresponding to the to-be-executed application is received, and the execution command includes the identifier of the to-be-executed application. The virtual machine image corresponding to the identifier of the to-be-executed application is obtained according to the identifier of the to-be-executed application that is included in the execution command. The metadata information of the virtual machine image and the layer data corresponding to the DOCKER container are read from all the layer data in the virtual machine image, and the layer data corresponding to the DOCKER container is the layer data required for operating the DOCKER container corresponding to the to-be-executed application. The snapshot layer file corresponding to the DOCKER container is generated according to the read layer data corresponding to the DOCKER container. The snapshot layer file corresponding to the DOCKER container includes the snapshot of the layer data corresponding to the DOCKER container, and the snapshot layer file corresponding to the DOCKER container is the readable and writable layer file. The snapshot layer file corresponding to the DOCKER container is mounted to the working directory, and the environment configuration is performed according to the read metadata information of the virtual machine image. The snapshot layer file that is mounted to the working directory and that corresponds to the DOCKER container is operated to operate the DOCKER container corresponding to the to-be-executed application. In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in this embodiment of the present disclosure, the application previously established in the virtual machine can operate in the DOCKER container using a simple and effective method, and a requirement for the developer is reduced.

Figure 2B:
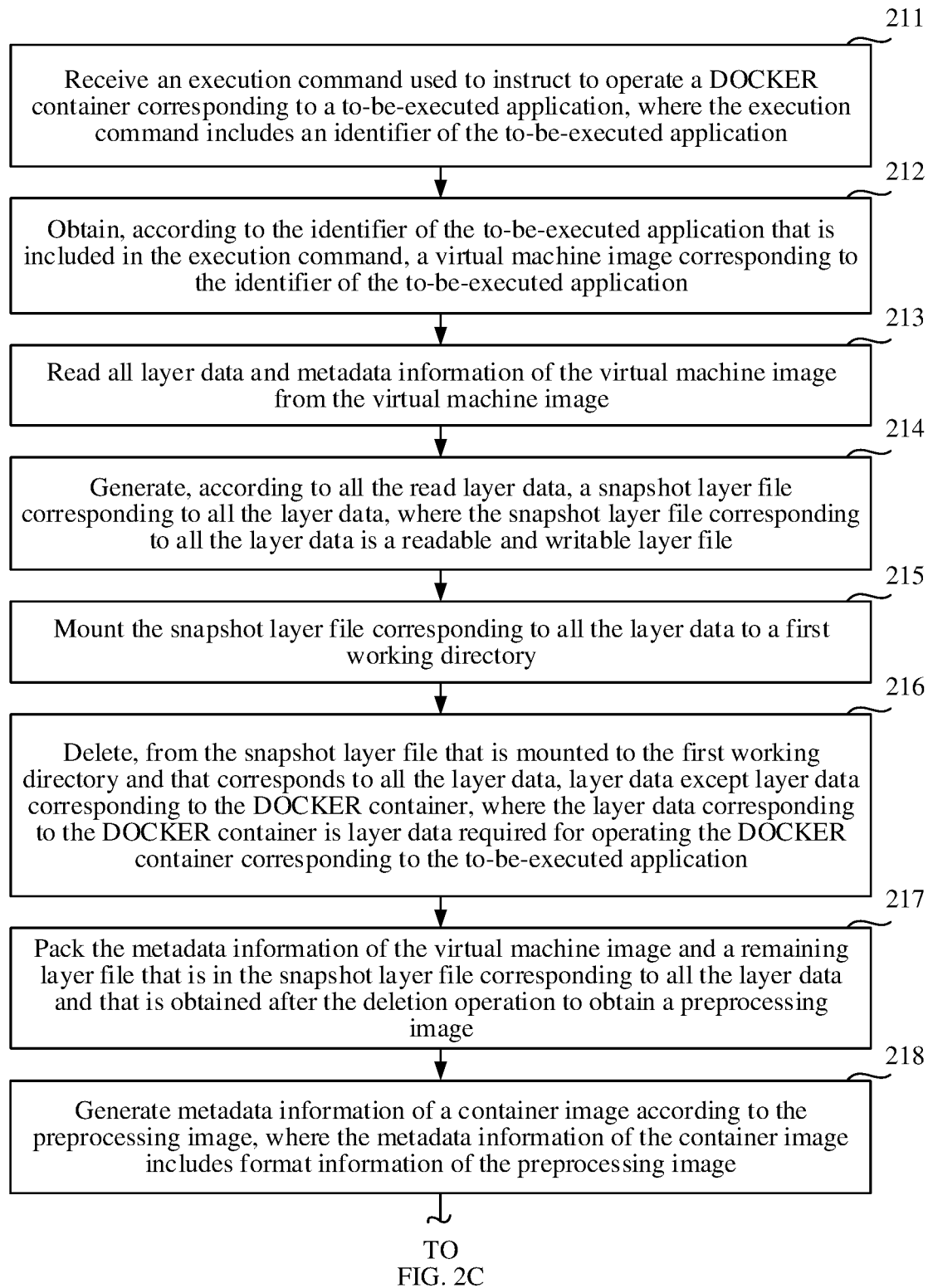

FIG. 2B and FIG. 2C show an example of a schematic flowchart of another DOCKER container operating method according to an embodiment of the present disclosure.

Based on a same concept, an embodiment of the present disclosure provides a DOCKER container operating method. As shown in FIG. 2B and FIG. 2C, the method includes the following steps.

Step 211: Receive an execution command used to instruct to operate a DOCKER container corresponding to a to-be-executed application, where the execution command includes an identifier of the to-be-executed application.

Step 212: Obtain, according to the identifier of the to-be-executed application that is included in the execution command, a virtual machine image corresponding to the identifier of the to-be-executed application.

Step 213: Read all layer data and metadata information of the virtual machine image from the virtual machine image.

Step 214: Generate, according to all the read layer data, a snapshot layer file corresponding to all the layer data, where the snapshot layer file corresponding to all the layer data is a readable and writable layer file.

Step 215: Mount the snapshot layer file corresponding to all the layer data to a first working directory.

Step 216: Delete, from the snapshot layer file that is mounted to the first working directory and that corresponds to all the layer data, layer data except layer data corresponding to the DOCKER container, where the layer data corresponding to the DOCKER container is layer data required for operating the DOCKER container corresponding to the to-be-executed application.

Step 217: Pack the metadata information of the virtual machine image and a remaining layer file that is in the snapshot layer file corresponding to all the layer data and that is obtained after the deletion operation to obtain a preprocessing image.

Step 218: Generate metadata information of a container image according to the preprocessing image, where the metadata information of the container image includes format information of the preprocessing image.

Step 219: Pack the preprocessing image and the metadata information of the container image to obtain a container image corresponding to the identifier of the to-be-executed application.

Step 221: Operate the container image corresponding to the identifier of the to-be-executed application to operate the DOCKER container corresponding to the to-be-executed application. A container image of the DOCKER container may be stored in a local container image storage area, or a container image of the DOCKER container may be uploaded to a container image registry. The container image storage area in FIG. 1 may be an area in which the container image is locally stored, or may be the container image registry such that a container image driver may obtain the container image from the container image storage area.

It can be learned that in this embodiment of the present disclosure, all the layer data and the metadata information of the virtual machine image may be read from the virtual machine image. In addition, all the layer data includes the layer data corresponding to the DOCKER container, and the layer data corresponding to the DOCKER container is layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in this embodiment of the present disclosure, the application previously established in the virtual machine can operate in the DOCKER container using a simple and effective method, and a requirement for the developer is reduced.

Before step 211, optionally, the virtual machine image corresponding to the identifier of the to-be-executed application is generated based on a virtual machine technology, and the virtual machine image corresponding to the identifier of the to-be-executed application is stored in a virtual machine image storage area. Then, step 212 includes obtaining, from the virtual machine image storage area according to the identifier of the to-be-executed application that is included in the execution command, the virtual machine image corresponding to the identifier of the to-be-executed application. The virtual machine image storage area may be in local, or may be in a cloud. Obtaining a virtual machine image corresponding to the identifier of the to-be-executed application includes locally obtaining the virtual machine image or downloading the virtual machine image from the cloud to local. Then, the read operation is performed on the virtual machine image in step 203.

In step 212 to step 219, the virtual machine image is converted into the container image, and then the container image is operated in step 221 to operate the DOCKER container corresponding to the to-be-executed application.

Optionally, step 213 includes invoking a virtual machine image driver, and reading all the layer data and the metadata information of the virtual machine image from the virtual machine image using the invoked virtual machine image driver.

Further, all the layer data included in the virtual machine image is virtual machine data information actually stored in the virtual machine image, such as an operating system, a library file, a runnable program, or configuration. All the layer data included in the virtual machine image is divided into two parts, the layer data corresponding to the DOCKER container and other layer data. The layer data corresponding to the DOCKER container is the layer data required for operating the DOCKER container corresponding to the to-be-executed application, that is, layer data that needs to be read when the to-be-executed application is operated. Optionally, the layer data corresponding to the DOCKER container includes layer data in all the layer data in the virtual machine image except a kernel file, a file in a system directory, and a file in a root (boot) directory. The other layer data is layer data that may not need to be read when the to-be-executed application is operated, such as the kernel file, the file in the system directory, or the file in the root (boot) directory.

The metadata information of the virtual machine image is format information of the virtual machine image. For example, information such as a storage format, a storage location, and a hierarchical relationship of information in a virtual machine image file is recorded. Preferably, the read metadata information of the virtual machine image and the read layer data corresponding to the DOCKER container are stored in local.

In step 214, optionally, a snapshot mechanism in the virtual machine is used as a basis, and the virtual machine image driver supports snapshot layer establishment for the virtual machine image in order to superpose the virtual machine image and the snapshot layer. Layering of the virtual machine image is similar to that of the container image. The layering of the container image is usually based on layering of a file system, and the layering of the virtual machine image is usually implemented based on a storage block.

In this embodiment of the present disclosure, the DOCKER container is further a container that is created for the to-be-executed application in a DOCKER technology. The to-be-executed application is previously established in the virtual machine. Therefore, there is a virtual machine image that is in the virtual machine and that corresponds to the to-be-executed application. The snapshot layer file corresponding to all the layer data is generated based on the snapshot mechanism in the virtual machine. The snapshot layer file corresponding to all the layer data is the readable and writable layer file.

In step 215, optionally, a snapshot layer file corresponding to layer data is mounted to the first working directory. The first working directory is used as a root (boot) directory of the DOCKER container. In this case, the root (boot) directory to which the snapshot layer file corresponding to the layer data is mounted is the first working directory. Further, a block device of the virtual machine image is generated according to all the layer data in the virtual machine image, and the block device of the virtual machine image is mounted to the first working directory. The block device is further a type of device in a LINUX system.

In step 216, the layer data in all the layer data included in the virtual machine image except the layer data corresponding to the DOCKER container is determined in the first working directory. Because the snapshot layer file is readable and writable, a system file in the virtual machine image may be deleted from the snapshot layer file. For example, the determined layer data in all the layer data included in the virtual machine image except the layer data corresponding to the DOCKER container is deleted. Further, the layer data corresponding to the DOCKER container includes layer data in all the layer data in the virtual machine image except a kernel file, a file in a system directory, and a file in a root (boot) directory, such as a file started with Initramfs or a file started with vmlinuz.

In step 218, the metadata information of the container image includes a storage format and a storage location of information in the preprocessing image, and a hierarchical relationship of the layer data corresponding to the DOCKER container. The metadata information of the container image may include information such as an identification (ID) and a size of the container image, a hierarchical relationship of the preprocessing image, an image ID, a parent image ID, establishment time, an environmental variable, an entry program, an applicable DOCKER version, author information, architecture information (such as amd64), an operating system (such as LINUX).

Optionally, to reduce resource occupation and system load, after step 219, the container image corresponding to the identifier of the to-be-executed application is stored in the container image storage area, the snapshot layer file corresponding to all the layer data is deleted, and the virtual machine image corresponding to the identifier of the to-be-executed application is offloaded.

The container image is obtained after step 212 to step 219. Optionally, in step 221, a container image driver is invoked, and the metadata information of the container image and the layer data corresponding to the DOCKER container are read from the container image using the invoked container image driver.

The metadata information of the container image and the layer data corresponding to the DOCKER container are read from the container image. The layer data corresponding to the DOCKER container is the layer data required for operating the DOCKER container corresponding to the to-be-executed application. In this case, layer data that only remains in the container image is the layer data corresponding to the DOCKER container.

A snapshot layer file corresponding to the DOCKER container is generated according to the read layer data corresponding to the DOCKER container. The snapshot layer file corresponding to the DOCKER container includes a snapshot of the layer data corresponding to the DOCKER container, and the snapshot layer file corresponding to the DOCKER container is a readable and writable layer file. The snapshot layer file corresponding to the DOCKER container is generated in the DOCKER container based on the snapshot mechanism. The snapshot layer file corresponding to the DOCKER container is also a working layer file, and may be used to store a file generated in a DOCKER container operating process.

The snapshot layer file corresponding to the DOCKER container is mounted to a second working directory, and environment configuration is performed according to the read metadata information of the container image. Further, a block device of the container image is generated according to layer data corresponding to the DOCKER container, and the block device of the container image is mounted to the second working directory. The block device is a type of device in the LINUX system. In this embodiment of the present disclosure, the second working directory and the first working directory may be a same working directory, or may be different working directories.

A system parameter is configured according to the read metadata information in the container image corresponding to the to-be-executed application such that the configured system parameter matches the metadata information in the container image corresponding to the to-be-executed application. The system parameter is an environmental variable or related parameter information of the to-be-operated application.

The snapshot layer file mounted to the second working directory is operated to operate the DOCKER container corresponding to the to-be-executed application.

According to the foregoing method provided in this embodiment of the present disclosure, massive virtual machine images corresponding to the to-be-executed application are quickly converted into container images such that a DOCKER creates a container for the to-be-executed application, and when operating the container of the to-be-executed application, directly operates the container image of the to-be-executed application using the container image driver.

It can be learned from the foregoing content that in this embodiment of the present disclosure, the execution command used to instruct to operate the DOCKER container corresponding to the to-be-executed application is received, and the execution command includes the identifier of the to-be-executed application. The virtual machine image corresponding to the identifier of the to-be-executed application is obtained according to the identifier of the to-be-executed application that is included in the execution command. All the layer data and the metadata information of the virtual machine image are read from the virtual machine image. The snapshot layer file corresponding to all the layer data is generated according to all the read layer data, and the snapshot layer file corresponding to all the layer data is the readable and writable layer file. The snapshot layer file corresponding to all the layer data is mounted to the first working directory. The layer data except the layer data corresponding to the DOCKER container is deleted from the snapshot layer file that is mounted to the first working directory and that corresponds to all the layer data, and the layer data corresponding to the DOCKER container is the layer data required for operating the DOCKER container corresponding to the to-be-executed application. The metadata information of the virtual machine image and the remaining layer file that is in the snapshot layer file corresponding to all the layer data and that is obtained after the deletion operation are packed to obtain the preprocessing image. The metadata information of the container image is generated according to the preprocessing image, and the metadata information of the container image includes the format information of the preprocessing image. The preprocessing image and the metadata information of the container image are packed to obtain the container image corresponding to the identifier of the to-be-executed application. The container image corresponding to the identifier of the to-be-executed application is operated to operate the DOCKER container corresponding to the to-be-executed application. In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in this embodiment of the present disclosure, the application previously established in the virtual machine can operate in the DOCKER container using a simple and effective method, and a requirement for the developer is reduced.

FIG. 3 shows an example of a schematic structural diagram of a DOCKER container operating apparatus 300 according to an embodiment of the present disclosure.

Based on a same concept, an embodiment of the present disclosure provides the DOCKER container operating apparatus 300. As shown in FIG. 3, the DOCKER container operating apparatus 300 includes a receiving unit 301, an obtaining unit 302, a processing unit 303, and a generation unit 304.

The receiving unit 301 is configured to receive an execution command used to instruct to operate a DOCKER container corresponding to a to-be-executed application, where the execution command includes an identifier of the to-be-executed application.

The obtaining unit 302 is configured to obtain, according to the identifier of the to-be-executed application that is included in the execution command, a virtual machine image corresponding to the identifier of the to-be-executed application.

The processing unit 303 is configured to read, from all layer data in the virtual machine image, metadata information of the virtual machine image and layer data corresponding to the DOCKER container, generate, according to the read layer data corresponding to the DOCKER container, a snapshot layer file corresponding to the DOCKER container, mount the snapshot layer file corresponding to the DOCKER container to a working directory, and perform environment configuration according to the read metadata information of the virtual machine image, and operate the snapshot layer file that is mounted to the working directory and that corresponds to the DOCKER container to operate the DOCKER container corresponding to the to-be-executed application.

The layer data corresponding to the DOCKER container is layer data required for operating the DOCKER container corresponding to the to-be-executed application, the snapshot layer file corresponding to the DOCKER container includes a snapshot of the layer data corresponding to the DOCKER container, and the snapshot layer file corresponding to the DOCKER container is a readable and writable layer file.

Optionally, the processing unit 303 is further configured to invoke a virtual machine image driver, and read, from all the layer data in the virtual machine image using the invoked virtual machine image driver, the metadata information of the virtual machine image and the layer data corresponding to the DOCKER container.

Optionally, the layer data corresponding to the DOCKER container includes layer data in all the layer data in the virtual machine image except a kernel file, a file in a system directory, and a file in a root (boot) directory.

Optionally, the processing unit 303 is further configured to configure a system parameter according to the read metadata information of the virtual machine image corresponding to the to-be-executed application such that the configured system parameter matches the metadata information of the virtual machine image corresponding to the to-be-executed application.

The system parameter is an environmental variable.

Optionally, the DOCKER container operating apparatus 300 further includes the generation unit 304 configured to generate, based on a virtual machine technology, the virtual machine image corresponding to the to-be-executed application, and store the virtual machine image in a virtual machine image storage area.

The obtaining unit 302 is further configured to obtain, from the virtual machine image storage area according to the identifier of the to-be-executed application that is included in the execution command, the virtual machine image corresponding to the identifier of the to-be-executed application.

In this embodiment of the present disclosure, the execution command used to instruct to operate the DOCKER container corresponding to the to-be-executed application is received, and the execution command includes the identifier of the to-be-executed application. The virtual machine image corresponding to the identifier of the to-be-executed application is obtained according to the identifier of the to-be-executed application that is included in the execution command. The metadata information of the virtual machine image and the layer data corresponding to the DOCKER container are read from all the layer data in the virtual machine image, and the layer data corresponding to the DOCKER container is the layer data required for operating the DOCKER container corresponding to the to-be-executed application. The snapshot layer file corresponding to the DOCKER container is generated according to the read layer data corresponding to the DOCKER container. The snapshot layer file corresponding to the DOCKER container includes the snapshot of the layer data corresponding to the DOCKER container, and the snapshot layer file corresponding to the DOCKER container is the readable and writable layer file. The snapshot layer file corresponding to the DOCKER container is mounted to the working directory, and the environment configuration is performed according to the read metadata information of the virtual machine image. The snapshot layer file that is mounted to the working directory and that corresponds to the DOCKER container is operated to operate the DOCKER container corresponding to the to-be-executed application. In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in the embodiments of the present disclosure, the application previously established in the virtual machine can operate in the DOCKER container using a simple and effective method, and a requirement for the developer is reduced.

Figure 4:
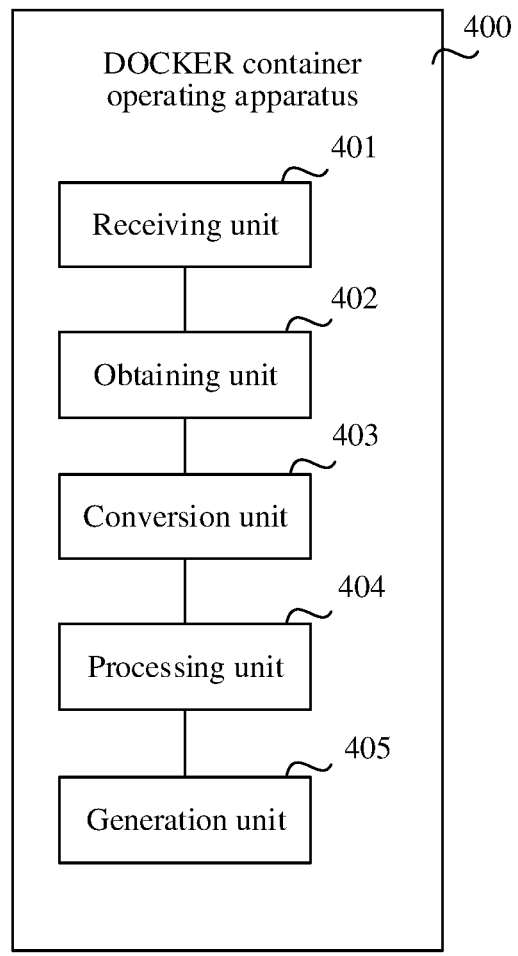
FIG. 4 is a schematic structural diagram of another DOCKER container operating apparatus according to an embodiment of the present disclosure.

FIG. 4 shows an example of a schematic structural diagram of a DOCKER container operating apparatus 400 according to an embodiment of the present disclosure.

Based on a same concept, an embodiment of the present disclosure provides the DOCKER container operating apparatus 400. As shown in FIG. 4, the DOCKER container operating apparatus 400 includes a receiving unit 401, an obtaining unit 402, a conversion unit 403, a processing unit 404, and a generation unit 405.

The receiving unit 401 is configured to receive an execution command used to instruct to operate a DOCKER container corresponding to a to-be-executed application, where the execution command includes an identifier of the to-be-executed application.

The obtaining unit 402 is configured to obtain, according to the identifier of the to-be-executed application that is included in the execution command, a virtual machine image corresponding to the identifier of the to-be-executed application.

The conversion unit 403 is configured to read all layer data and metadata information of the virtual machine image from the virtual machine image, generate, according to all the read layer data, a snapshot layer file corresponding to all the layer data, where the snapshot layer file corresponding to all the layer data is a readable and writable layer file, mount the snapshot layer file corresponding to all the layer data to a first working directory, delete, from the snapshot layer file that is mounted to the first working directory and that corresponds to all the layer data, layer data except layer data corresponding to the DOCKER container, pack the metadata information of the virtual machine image and a remaining layer file that is in the snapshot layer file corresponding to all the layer data and that is obtained after the deletion operation to obtain a preprocessing image, generate metadata information of a container image according to the preprocessing image, where the metadata information of the container image includes format information of the preprocessing image, and pack the preprocessing image and the metadata information of the container image to obtain the container image corresponding to the identifier of the to-be-executed application, where the layer data corresponding to the DOCKER container is layer data required for operating the DOCKER container corresponding to the to-be-executed application.

The processing unit 404 is configured to operate the container image corresponding to the identifier of the to-be-executed application to operate the DOCKER container corresponding to the to-be-executed application.

Optionally, the conversion unit 403 is further configured to invoke a virtual machine image driver, and read all the layer data and the metadata information of the virtual machine image from the virtual machine image using the invoked virtual machine image driver.

Optionally, the layer data corresponding to the DOCKER container includes layer data in all the layer data in the virtual machine image except a kernel file, a file in a system directory, and a file in a root (boot) directory.

The metadata information of the container image includes a storage format and a storage location of information in the preprocessing image, and a hierarchical relationship of the layer data corresponding to the DOCKER container.

Optionally, the conversion unit 403 is further configured to store, in a container image storage area, the container image corresponding to the identifier of the to-be-executed application, delete the snapshot layer file corresponding to all the layer data, and offload the virtual machine image corresponding to the identifier of the to-be-executed application.

Optionally, the processing unit 404 is further configured to read, from the container image, the metadata information of the container image and the layer data corresponding to the DOCKER container, where the layer data corresponding to the DOCKER container is the layer data required for operating the DOCKER container corresponding to the to-be-executed application, generate, according to the read layer data corresponding to the DOCKER container, a snapshot layer file corresponding to the DOCKER container, where the snapshot layer file corresponding to the DOCKER container includes a snapshot of the layer data corresponding to the DOCKER container, and the snapshot layer file corresponding to the DOCKER container is a readable and writable layer file, mount the snapshot layer file corresponding to the DOCKER container to a second working directory, perform environment configuration according to the read metadata information of the container image, and operate the snapshot layer file mounted to the second working directory to operate the DOCKER container corresponding to the to-be-executed application.

Optionally, the processing unit 404 is further configured to invoke a container image driver, and read, from the container image using the invoked container image driver, the metadata information of the container image and the layer data corresponding to the DOCKER container.

Optionally, the processing unit 404 is further configured to configure a system parameter according to the read metadata information in the container image corresponding to the to-be-executed application such that the configured system parameter matches the metadata information in the container image corresponding to the to-be-executed application.

The system parameter is an environmental variable.

Optionally, the DOCKER container operating apparatus 400 further includes the generation unit 405 configured to generate, based on a virtual machine technology, the virtual machine image corresponding to the identifier of the to-be-executed application, and store, in a virtual machine image storage area, the virtual machine image corresponding to the identifier of the to-be-executed application.

The obtaining unit 402 is further configured to obtain, from the virtual machine image storage area according to the identifier of the to-be-executed application that is included in the execution command, the virtual machine image corresponding to the identifier of the to-be-executed application.

It can be learned from the foregoing content that in this embodiment of the present disclosure, the execution command used to instruct to operate the DOCKER container corresponding to the to-be-executed application is received, and the execution command includes the identifier of the to-be-executed application. The virtual machine image corresponding to the identifier of the to-be-executed application is obtained according to the identifier of the to-be-executed application that is included in the execution command. All the layer data and the metadata information of the virtual machine image are read from the virtual machine image. The snapshot layer file corresponding to all the layer data is generated according to all the read layer data, and the snapshot layer file corresponding to all the layer data is the readable and writable layer file. The snapshot layer file corresponding to all the layer data is mounted to the first working directory. The layer data except the layer data corresponding to the DOCKER container is deleted from the snapshot layer file that is mounted to the first working directory and that corresponds to all the layer data, and the layer data corresponding to the DOCKER container is the layer data required for operating the DOCKER container corresponding to the to-be-executed application. The metadata information of the virtual machine image and the remaining layer file that is in the snapshot layer file corresponding to all the layer data and that is obtained after the deletion operation are packed to obtain the preprocessing image. The metadata information of the container image is generated according to the preprocessing image, and the metadata information of the container image includes the format information of the preprocessing image. The preprocessing image and the metadata information of the container image are packed to obtain the container image corresponding to the identifier of the to-be-executed application. The container image corresponding to the identifier of the to-be-executed application is operated to operate the DOCKER container corresponding to the to-be-executed application. In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in the embodiments of the present disclosure, the application previously established in the virtual machine can operate in the DOCKER container using a simple and effective method, and a requirement for the developer is reduced.

Figure 5:
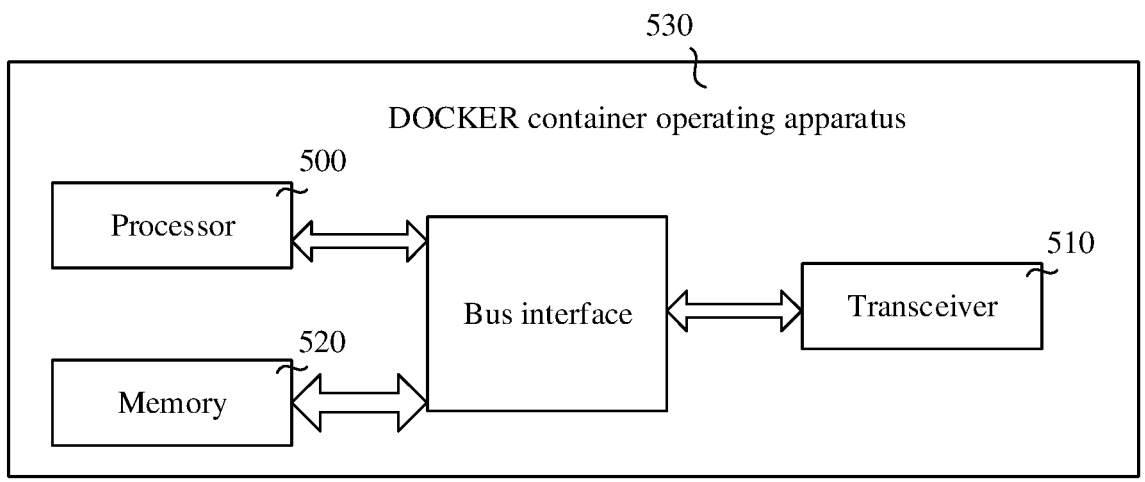
FIG. 5 is a schematic structural diagram of another DOCKER container operating apparatus according to an embodiment of the present disclosure.

FIG. 5 shows an example of a schematic structural diagram of another DOCKER container operating apparatus 530 according to an embodiment of the present disclosure.

Based on a same concept, an embodiment of the present disclosure provides the DOCKER container operating apparatus 530. As shown in FIG. 5, the DOCKER container operating apparatus 530 includes a transceiver 510, a processor 500, and a memory 520. The processor 500, the transceiver 510 and the memory 520 are coupled to each other using a bus interface.

The processor 500 is configured to read a program in the memory 520, and perform the process of receiving, using the transceiver 510, an execution command used to instruct to operate a DOCKER container corresponding to a to-be-executed application, where the execution command includes an identifier of the to-be-executed application.

The processor 500 is configured to obtain, according to the identifier of the to-be-executed application that is included in the execution command, a virtual machine image corresponding to the identifier of the to-be-executed application, read, from all layer data in the virtual machine image, metadata information of the virtual machine image and layer data corresponding to the DOCKER container, generate, according to the read layer data corresponding to the DOCKER container, a snapshot layer file corresponding to the DOCKER container, mount the snapshot layer file corresponding to the DOCKER container to a working directory, perform environment configuration according to the read metadata information of the virtual machine image, and operate the snapshot layer file that is mounted to the working directory and that corresponds to the DOCKER container to operate the DOCKER container corresponding to the to-be-executed application.

The layer data corresponding to the DOCKER container is layer data required for operating the DOCKER container corresponding to the to-be-executed application, the snapshot layer file corresponding to the DOCKER container includes a snapshot of the layer data corresponding to the DOCKER container, and the snapshot layer file corresponding to the DOCKER container is a readable and writable layer file.

The memory 520 is configured to store the foregoing program and the virtual machine image corresponding to the identifier of the to-be-executed application.

Optionally, the processor 500 is further configured to invoke a virtual machine image driver, and read, from all the layer data in the virtual machine image using the invoked virtual machine image driver, the metadata information of the virtual machine image and the layer data corresponding to the DOCKER container.

Optionally, the layer data corresponding to the DOCKER container includes layer data in all the layer data in the virtual machine image except a kernel file, a file in a system directory, and a file in a root (boot) directory.

Optionally, the processor 500 is further configured to configure a system parameter according to the read metadata information of the virtual machine image corresponding to the to-be-executed application such that the configured system parameter matches the metadata information of the virtual machine image corresponding to the to-be-executed application.

The system parameter is an environmental variable.

Optionally, the processor 500 is further configured to generate, based on a virtual machine technology, the virtual machine image corresponding to the to-be-executed application, store the virtual machine image in a virtual machine image storage area, and obtain, from the virtual machine image storage area according to the identifier of the to-be-executed application that is included in the execution command, the virtual machine image corresponding to the identifier of the to-be-executed application.

In this embodiment of the present disclosure, the execution command used to instruct to operate the DOCKER container corresponding to the to-be-executed application is received, and the execution command includes the identifier of the to-be-executed application. The virtual machine image corresponding to the identifier of the to-be-executed application is obtained according to the identifier of the to-be-executed application that is included in the execution command. The metadata information of the virtual machine image and the layer data corresponding to the DOCKER container are read from all the layer data in the virtual machine image, and the layer data corresponding to the DOCKER container is the layer data required for operating the DOCKER container corresponding to the to-be-executed application. The snapshot layer file corresponding to the DOCKER container is generated according to the read layer data corresponding to the DOCKER container. The snapshot layer file corresponding to the DOCKER container includes the snapshot of the layer data corresponding to the DOCKER container, and the snapshot layer file corresponding to the DOCKER container is the readable and writable layer file. The snapshot layer file corresponding to the DOCKER container is mounted to the working directory, and the environment configuration is performed according to the read metadata information of the virtual machine image. The snapshot layer file that is mounted to the working directory and that corresponds to the DOCKER container is operated to operate the DOCKER container corresponding to the to-be-executed application. In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in the embodiments of the present disclosure, the application previously established in the virtual machine can operate in the DOCKER container using a simple and effective method, and a requirement for the developer is reduced.

Figure 6:
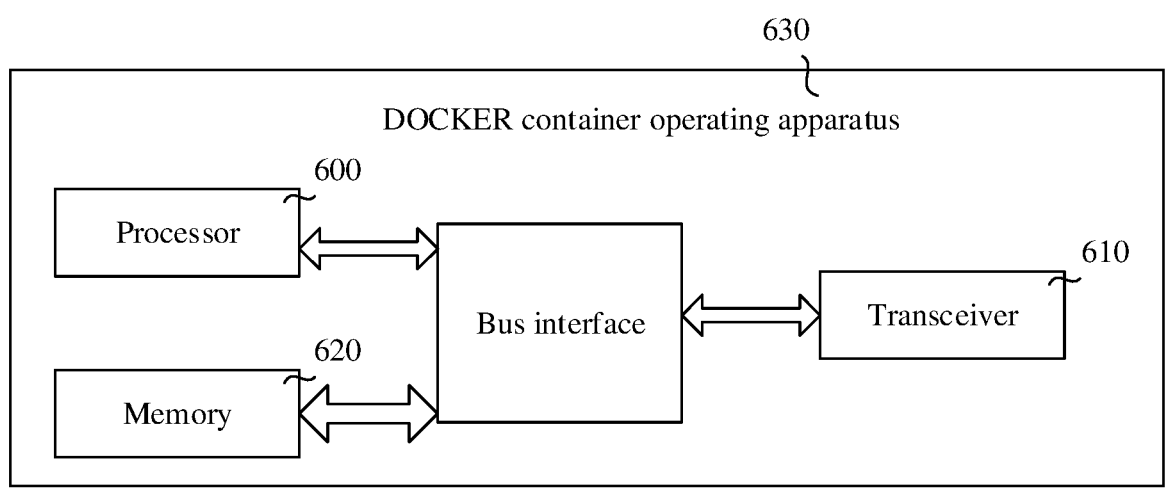
FIG. 6 is a schematic structural diagram of another DOCKER container operating apparatus according to an embodiment of the present disclosure.

FIG. 6 shows an example of a schematic structural diagram of another DOCKER container operating apparatus 630 according to an embodiment of the present disclosure.

Based on a same concept, an embodiment of the present disclosure provides the DOCKER container operating apparatus 630. As shown in FIG. 6, the DOCKER container operating apparatus 630 includes a transceiver 610, a processor 600, and a memory 620. The processor 600, the transceiver 610 and the memory 620 are coupled to each other using a bus interface.

The processor 600 is configured to read a program in the memory 620, and perform the process of receiving, using the transceiver 610, an execution command used to instruct to operate a DOCKER container corresponding to a to-be-executed application, where the execution command includes an identifier of the to-be-executed application.

The processor 600 is configured to obtain, according to the identifier of the to-be-executed application that is included in the execution command, a virtual machine image corresponding to the identifier of the to-be-executed application, read all layer data and metadata information of the virtual machine image from the virtual machine image, generate, according to all the read layer data, a snapshot layer file corresponding to all the layer data, where the snapshot layer file corresponding to all the layer data is a readable and writable layer file, mount the snapshot layer file corresponding to all the layer data to a first working directory, delete, from the snapshot layer file that is mounted to the first working directory and that corresponds to all the layer data, layer data except layer data corresponding to the DOCKER container, pack the metadata information of the virtual machine image and a remaining layer file that is in the snapshot layer file corresponding to all the layer data and that is obtained after the deletion operation to obtain a preprocessing image, generate metadata information of a container image according to the preprocessing image, where the metadata information of the container image includes format information of the preprocessing image, pack the preprocessing image and the metadata information of the container image to obtain the container image corresponding to the identifier of the to-be-executed application, where the layer data corresponding to the DOCKER container is layer data required for operating the DOCKER container corresponding to the to-be-executed application, and operate the container image corresponding to the identifier of the to-be-executed application to operate the DOCKER container corresponding to the to-be-executed application.

The memory 620 is configured to store the foregoing program, and the virtual machine image and the container image that correspond to the identifier of the to-be-executed application.

Optionally, the processor 600 is further configured to invoke a virtual machine image driver, and read all the layer data and the metadata information of the virtual machine image from the virtual machine image using the invoked virtual machine image driver.

Optionally, the layer data corresponding to the DOCKER container includes layer data in all the layer data in the virtual machine image except a kernel file, a file in a system directory, and a file in a root (boot) directory.

The metadata information of the container image includes a storage format and a storage location of information in the preprocessing image, and a hierarchical relationship of the layer data corresponding to the DOCKER container.

Optionally, the processor 600 is further configured to store, in a container image storage area, the container image corresponding to the identifier of the to-be-executed application, and delete the snapshot layer file corresponding to all the layer data, and offload the virtual machine image corresponding to the identifier of the to-be-executed application.

Optionally, the processor 600 is further configured to read, from the container image, the metadata information of the container image and the layer data corresponding to the DOCKER container, where the layer data corresponding to the DOCKER container is the layer data required for operating the DOCKER container corresponding to the to-be-executed application, generate, according to the read layer data corresponding to the DOCKER container, a snapshot layer file corresponding to the DOCKER container, where the snapshot layer file corresponding to the DOCKER container includes a snapshot of the layer data corresponding to the DOCKER container, and the snapshot layer file corresponding to the DOCKER container is a readable and writable layer file, mount the snapshot layer file corresponding to the DOCKER container to a second working directory, and perform environment configuration according to the read metadata information of the container image, and operate the snapshot layer file mounted to the second working directory to operate the DOCKER container corresponding to the to-be-executed application.

Optionally, the processor 600 is further configured to invoke a container image driver, and read, from the container image using the invoked container image driver, the metadata information of the container image and the layer data corresponding to the DOCKER container.

Optionally, the processor 600 is further configured to configure a system parameter according to the read metadata information in the container image corresponding to the to-be-executed application such that the configured system parameter matches the metadata information in the container image corresponding to the to-be-executed application.

The system parameter is an environmental variable.

Optionally, the processor 600 is further configured to generate, based on a virtual machine technology, the virtual machine image corresponding to the identifier of the to-be-executed application, and store, in a virtual machine image storage area, the virtual machine image corresponding to the identifier of the to-be-executed application, and obtain, from the virtual machine image storage area according to the identifier of the to-be-executed application that is included in the execution command, the virtual machine image corresponding to the identifier of the to-be-executed application.

It can be learned from the foregoing content that in this embodiment of the present disclosure, the execution command used to instruct to operate the DOCKER container corresponding to the to-be-executed application is received, and the execution command includes the identifier of the to-be-executed application. The virtual machine image corresponding to the identifier of the to-be-executed application is obtained according to the identifier of the to-be-executed application that is included in the execution command. All the layer data and the metadata information of the virtual machine image are read from the virtual machine image. The snapshot layer file corresponding to all the layer data is generated according to all the read layer data, and the snapshot layer file corresponding to all the layer data is the readable and writable layer file. The snapshot layer file corresponding to all the layer data is mounted to the first working directory. The layer data except the layer data corresponding to the DOCKER container is deleted from the snapshot layer file that is mounted to the first working directory and that corresponds to all the layer data, and the layer data corresponding to the DOCKER container is the layer data required for operating the DOCKER container corresponding to the to-be-executed application. The metadata information of the virtual machine image and the remaining layer file that is in the snapshot layer file corresponding to all the layer data and that is obtained after the deletion operation are packed to obtain the preprocessing image. The metadata information of the container image is generated according to the preprocessing image, and the metadata information of the container image includes the format information of the preprocessing image. The preprocessing image and the metadata information of the container image are packed to obtain the container image corresponding to the identifier of the to-be-executed application. The container image corresponding to the identifier of the to-be-executed application is operated, to operate the DOCKER container corresponding to the to-be-executed application. In this embodiment of the present disclosure, the metadata information of the virtual machine image and the layer data corresponding to the DOCKER container may be read from all the layer data in the virtual machine image, and the layer data corresponding to the DOCKER container is the layer data required for operating the DOCKER container corresponding to the to-be-executed application. The DOCKER container corresponding to the to-be-executed application may operate according to the read metadata information of the virtual machine image and the read layer data corresponding to the DOCKER container. It can be learned that this process is simple and efficient. The following is avoided. In the other approaches, a virtual machine image of a to-be-executed application is manually converted into a container image. A developer does not need to learn of both overall deployment of the virtual machine image corresponding to the to-be-executed application, and a container image establishment method. It can be learned that according to the method provided in the embodiments of the present disclosure, the application previously established in the virtual machine can operate in the DOCKER container using a simple and effective method, and a requirement for the developer is reduced.

A person skilled in the art should understand that the embodiments of the present disclosure may be provided as a method, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general purpose computer, a dedicated computer, an embedded processor, or a processor of any other programmable data processing device to generate a machine such that the instructions executed by a computer or a processor of any other programmable data processing device generate an apparatus for implementing a specific function in one or more procedures in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable devices provide steps for implementing a specific function in one or more procedures in the flowcharts and/or in one or more blocks in the block diagrams.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A DOCKER container operating method, comprising:
  receiving an execution command instructing to operate a DOCKER container corresponding to a to-be-executed application, wherein the execution command comprises an identifier of the to-be-executed application;
  obtaining, according to the identifier of the to-be-executed application comprised in the execution command, a virtual machine image corresponding to the identifier of the to-be-executed application;
  reading, from all layer data in the virtual machine image, metadata information of the virtual machine image and layer data corresponding to the DOCKER container, wherein the layer data corresponding to the DOCKER container comprises layer data required for operating the DOCKER container corresponding to the to-be-executed application;
  generating, according to the read layer data corresponding to the DOCKER container, a snapshot layer file corresponding to the DOCKER container, wherein the snapshot layer file corresponding to the DOCKER container comprises a readable and writable layer file and a snapshot of the layer data corresponding to the DOCKER container;
  mounting the snapshot layer file corresponding to the DOCKER container to a working directory;
  performing environment configuration according to the read metadata information of the virtual machine image; and
  operating the snapshot layer file mounted to the working directory corresponding to the DOCKER container to operate the DOCKER container corresponding to the to-be-executed application.

2. The method according to claim 1, wherein reading the metadata information of the virtual machine image and the layer data corresponding to the Docker container comprises:
  invoking a virtual machine image driver; and
  reading, from all the layer data in the virtual machine image using the invoked virtual machine image driver, the metadata information of the virtual machine image and the layer data corresponding to the DOCKER container.

3. The method according to claim 1, wherein the layer data corresponding to the DOCKER container comprises:
  layer data in all the layer data in the virtual machine image except a kernel file;
  a file in a system directory; and
  a file in a root (boot) directory.

4. The method according to claim 1, wherein performing the environment configuration comprises configuring a system parameter according to the read metadata information of the virtual machine image corresponding to the to-be-executed application, wherein the configured system parameter matches the metadata information of the virtual machine image corresponding to the to-be-executed application, and wherein the system parameter comprises an environmental variable.

5. The method according to claim 1, wherein before obtaining the virtual machine image, the method further comprises:
  generating, based on a virtual machine technology, the virtual machine image corresponding to the to-be-executed application; and
  storing the virtual machine image in a virtual machine image storage area, and
  wherein obtaining the virtual machine image comprises obtaining, from the virtual machine image storage area according to the identifier of the to-be-executed application comprised in the execution command, the virtual machine image corresponding to the identifier of the to-be-executed application.

6. A DOCKER container operating method, comprising:
  receiving an execution command instructing to operate a DOCKER container corresponding to a to-be-executed application, wherein the execution command comprises an identifier of the to-be-executed application;
  obtaining, according to the identifier of the to-be-executed application comprised in the execution command, a virtual machine image corresponding to the identifier of the to-be-executed application;
  reading all layer data and metadata information of the virtual machine image from the virtual machine image;
  generating, according to all the read layer data, a snapshot layer file corresponding to all the layer data, wherein the snapshot layer file corresponding to all the layer data comprises a readable and writable layer file;
  mounting the snapshot layer file corresponding to all the layer data to a first working directory;

deleting, from the snapshot layer file mounted to the first working directory corresponding to all the layer data, layer data except layer data corresponding to the DOCKER container, wherein the layer data corresponding to the DOCKER container comprises layer data required for operating the DOCKER container corresponding to the to-be-executed application;

packing the metadata information of the virtual machine image and a remaining layer file in the snapshot layer file corresponding to all the layer data that is obtained after the deletion to obtain a preprocessing image;

generating metadata information of a container image according to the preprocessing image, wherein the metadata information of the container image comprises format information of the preprocessing image;

packing the preprocessing image and the metadata information of the container image to obtain the container image corresponding to the identifier of the to-be-executed application; and operating the container image corresponding to the identifier of the to-be-executed application to operate the DOCKER container corresponding to the to-be-executed application.

7. The method according to claim 6, wherein reading all the layer data and the metadata information of the virtual machine image comprises:

invoking a virtual machine image driver; and reading all the layer data and the metadata information of the virtual machine image from the virtual machine image using the invoked virtual machine image driver.

8. The method according to claim 6, wherein the layer data corresponding to the DOCKER container comprises:

layer data in all the layer data in the virtual machine image except a kernel file;

a file in a system directory; and a file in a root (boot) directory, and wherein the metadata information of the container image comprises:

a storage format and a storage location of information in the preprocessing image; and a hierarchical relationship of the layer data corresponding to the DOCKER container.

9. The method according to claim 6, wherein after packing the preprocessing image and the metadata information of the container image, the method further comprises:

storing, in a container image storage area, the container image corresponding to the identifier of the to-be-executed application;

deleting the snapshot layer file corresponding to all the layer data: and offloading the virtual machine image corresponding to the identifier of the to-be-executed application.

10. The method according to claim 6, wherein operating the container image corresponding to the identifier of the to-be-executed application comprises:

reading, from the container image, the metadata information of the container image and the layer data corresponding to the DOCKER container, wherein the layer data corresponding to the DOCKER container comprises the layer data required for operating the DOCKER container corresponding to the to-be-executed application;

generating, according to the read layer data corresponding to the DOCKER container, a snapshot layer file corresponding to the DOCKER container, wherein the snapshot layer file corresponding to the DOCKER container comprises a readable and writable layer file and a snapshot of the layer data corresponding to the DOCKER container;

mounting the snapshot layer file corresponding to the DOCKER container to a second working directory;

performing environment configuration according to the read metadata information of the container image; and operating the snapshot layer file mounted to the second working directory to operate the DOCKER container corresponding to the to-be-executed application.

11. The method according to claim 10, wherein reading the metadata information of the container image and the layer data corresponding to the DOCKER container comprises:

invoking a container image driver; and reading, from the container image using the invoked container image driver, the metadata information of the container image and the layer data corresponding to the DOCKER container.

12. The method according to claim 10, wherein performing the environment configuration comprises configuring a system parameter according to the read metadata information in the container image corresponding to the to-be-executed application, wherein the configured system parameter matches the metadata information in the container image corresponding to the to-be-executed application, and wherein the system parameter comprises an environmental variable.

13. The method according to claim 6, wherein before obtaining the virtual machine image, the method further comprises:

generating, based on a virtual machine technology, the virtual machine image corresponding to the identifier of the to-be-executed application; and storing, in a virtual machine image storage area, the virtual machine image corresponding to the identifier of the to-be-executed application, and wherein obtaining the virtual machine image comprises obtaining, from the virtual machine image storage area according to the identifier of the to-be-executed application comprised in the execution command, the virtual machine image corresponding to the identifier of the to-be-executed application.

14. A DOCKER container operating apparatus, comprising:

a memory comprising a plurality of instructions; and a processor coupled to the memory, wherein the instructions cause the processor to be configured to:

receive an execution command instructing to operate a DOCKER container corresponding to a to-be-executed application, wherein the execution command comprises an identifier of the to-be-executed application;

obtain, according to the identifier of the to-be-executed application comprised in the execution command, a virtual machine image corresponding to the identifier of the to-be-executed application;

read, from all layer data in the virtual machine image, metadata information of the virtual machine image and layer data corresponding to the DOCKER container;

generate, according to the read layer data corresponding to the DOCKER container, a snapshot layer file corresponding to the DOCKER container;

mount the snapshot layer file corresponding to the DOCKER container to a working directory;

perform environment configuration according to the read metadata information of the virtual machine image; and operate the snapshot layer file mounted to the working directory corresponding to the DOCKER container to operate the DOCKER container corresponding to the to-be-executed application, wherein the layer data corresponding to the DOCKER container comprises layer data required for operating the DOCKER container corresponding to the to-be-executed application, and wherein the snapshot layer file corresponding to the DOCKER container comprises a readable and writable layer file and a snapshot of the layer data corresponding to the DOCKER container.

15. The apparatus according to claim 14, wherein the instructions further cause the processor to be configured to:
invoke a virtual machine image driver; and
read, from all the layer data in the virtual machine image using the invoked virtual machine image driver, the metadata information of the virtual machine image and the layer data corresponding to the DOCKER container.

16. The apparatus according to claim 14, wherein the layer data corresponding to the DOCKER container comprises:
layer data in all the layer data in the virtual machine image except a kernel file;
a file in a system directory; and
a file in a root (boot) directory.

17. A DOCKER container operating apparatus, comprising:
a memory comprising a plurality of instructions; and
a processor coupled to the memory, wherein the instructions cause the processor to be configured to:
receive an execution command instructing to operate a DOCKER container corresponding to a to-be-executed application, wherein the execution command comprises an identifier of the to-be-executed application;
obtain, according to the identifier of the to-be-executed application comprised in the execution command, a virtual machine image corresponding to the identifier of the to-be-executed application;
read all layer data and metadata information of the virtual machine image from the virtual machine image;
generate, according to all the read layer data, a snapshot layer file corresponding to all the layer data, wherein the snapshot layer file corresponding to all the layer data comprises a readable and writable layer file;
mount the snapshot layer file corresponding to all the layer data to a first working directory;
delete, from the snapshot layer file mounted to the first working directory corresponding to all the layer data, layer data except layer data corresponding to the DOCKER container;
pack the metadata information of the virtual machine image and a remaining layer file in the snapshot layer file corresponding to all the layer data obtained after deletion to obtain a preprocessing image;

generate metadata information of a container image according to the preprocessing image, wherein the metadata information of the container image comprises format information of the preprocessing image; and pack the preprocessing image and the metadata information of the container image to obtain the container image corresponding to the identifier of the to-be-executed application, wherein the layer data corresponding to the DOCKER container comprises layer data required for operating the DOCKER container corresponding to the to-be-executed application; and operate the container image corresponding to the identifier of the to-be-executed application to operate the DOCKER container corresponding to the to-be-executed application.

18. The apparatus according to claim 17, wherein the instructions further cause the processor to be configured to:
invoke a virtual machine image driver; and
read all the layer data and the metadata information of the virtual machine image from the virtual machine image using the invoked virtual machine image driver.

19. The apparatus according to claim 17, wherein the layer data corresponding to the DOCKER container comprises:
layer data in all the layer data in the virtual machine image except a kernel file;
a file in a system directory; and
a file in a root (boot) directory, and
wherein the metadata information of the container image comprises:
a storage format and a storage location of information in the preprocessing image; and
a hierarchical relationship of the layer data corresponding to the DOCKER container.

20. The apparatus according to claim 17, wherein the instructions further cause the processor to be configured to:
read, from the container image, the metadata information of the container image and the layer data corresponding to the DOCKER container, wherein the layer data corresponding to the DOCKER container comprises the layer data required for operating the DOCKER container corresponding to the to-be-executed application;
generate, according to the read layer data corresponding to the DOCKER container, a snapshot layer file corresponding to the DOCKER container, wherein the snapshot layer file corresponding to the DOCKER container comprises a readable and writable layer file and a snapshot of the layer data corresponding to the DOCKER container;
mount the snapshot layer file corresponding to the DOCKER container to a second working directory;
perform environment configuration according to the read metadata information of the container image; and
operate the snapshot layer file mounted to the second working directory to operate the DOCKER container corresponding to the to-be-executed application.

* * * * *